Dec. 16, 1930.  C. A. ZWEIBEL  1,785,170
HAND BRAKE
Filed Dec. 5, 1928
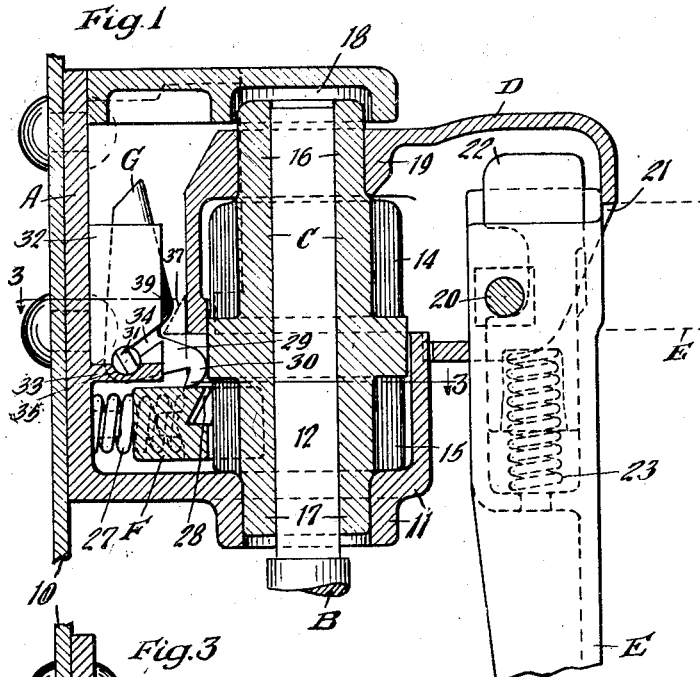
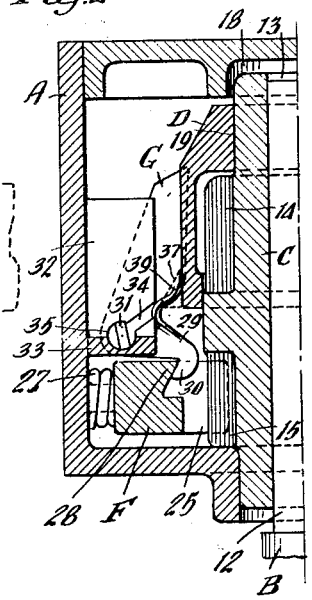
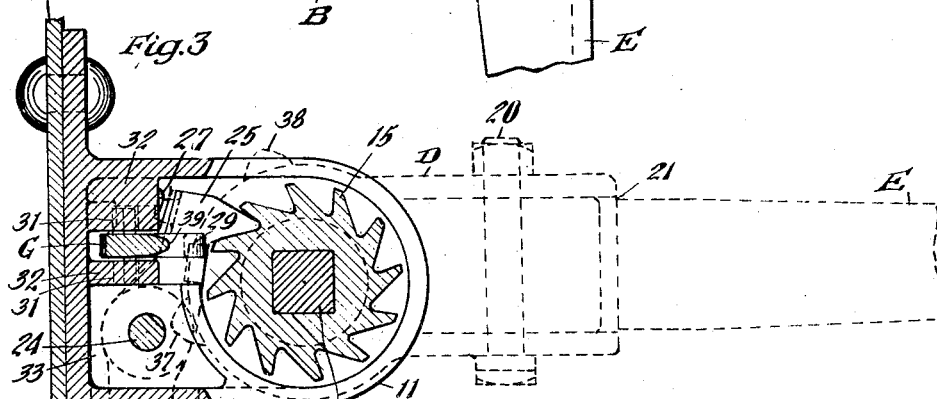
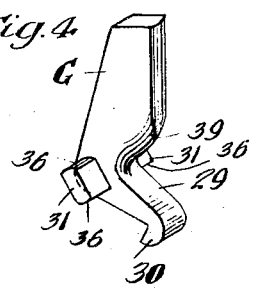
Witness
Wm. Geiger
Inventor
Charles A. Zweibel
By Joseph Harris
His Atty.

Patented Dec. 16, 1930

1,785,170

UNITED STATES PATENT OFFICE

CHARLES A. ZWEIBEL, OF LOUISVILLE, KENTUCKY, ASSIGNOR TO W. H. MINER, INC., OF CHICAGO, ILLINOIS, A CORPORATION OF DELAWARE

HAND BRAKE

Application filed December 5, 1928. Serial No. 323,821.

This invention relates to improvements in hand brakes.

In the operation of railway cars having hand-operated brake mechanism, and especially in connection with cars equipped with a brake chain winding staff having means comprising a dog engaging a ratchet fixed to the staff for preventing retrograde rotation of the staff and for holding the same against unwinding movement, in connection with which means is employed for locking the holding means in inoperative position to permit complete unwinding of the brake chain, it frequently occurs that the winding mechanism is rendered inoperative, due to the holding means for preventing the retrograde movement of the staff not being brought back to operative position by failure of the operator to release the locking means. It will be appreciated that it is highly important in the operation of railway trains for the hand brake mechanism to be at all times fully operative to apply the brakes when needed, and that inoperativeness thereof, due to the means for preventing retrograde rotation of the brake staff not functioning, is a source of great danger and a serious defect. It is the principal object of my invention to overcome this defect by providing means for automatically rendering the entire brake mechanism operative when the brake staff is rotated to wind the brakes.

A further object of the invention is to provide a hand brake mechanism for railway cars, including a chain winding staff actuated by a ratchet mechanism, including a manually operated lever, together with means for preventing retrograde movement of the staff comprising a ratchet fixed to the staff and cooperating with a pivoted dog which may be manually thrown out of operation and held in inoperative position by locking means, so as to permit free rotation of the staff in an unwinding direction, wherein means is provided, operated through the manipulation of the actuating lever for disengaging the locking means to free the dog and again render the same operative.

A more specific object of the invention is to provide a hand brake mechanism including: a rotary winding staff; means for rotating the staff to wind the chain, including an oscillating carrier operated by a hand lever pivoted to the carrier, the hand lever and staff having cooperating ratchet means thereon; a second ratchet member fixed to the staff; a spring-pressed dog cooperating with the second ratchet to prevent retrograde movement of the staff, the dog being provided with an operating handle for retracting the dog to inoperative position to permit free rotation of the staff in an unwinding direction; a gravity-controlled latch member for locking the dog in inoperative position; and cam means on the carrier for unlocking the latch from the dog, wherein the cam means is arranged to engage and unlock the dog upon oscillating movement being imparted to the carrier by the operating lever during the to-and-fro swinging movement thereof in effecting the chain-winding operation.

Other and further objects of the invention will more clearly appear from the description and claims hereinafter following.

In the drawing, forming a part of this specification, Figure 1 is a vertical, sectional view through a portion of the end wall of a car and a portion of the hand brake mechanism, illustrating my improvements in connection therewith. Figure 2 is a vertical, sectional view, similar to Figure 1, partly broken away and illustrating the latch member in locking relation to the dog. Figure 3 is a horizontal, sectional view, corresponding substantially to the line 3—3 of Figure 1, the operating lever of the brake mechanism being shown in dotted lines. And Figure 4 is a detailed perspective view of the latch member employed in connection with my improved brake mechanism.

In said drawings, 10 denotes the end wall of a railway car to which my improved brake mechanism is attached. The brake mechanism, in connection with which my invention is illustrated, is shown as of the vertical staff type.

In carrying out my invention, I provide a housing A; a vertical brake staff B having a ratchet member C thereon; a carrier D rotatable about the staff; an operating lever E pivoted to the carrier; a dog F for preventing unwinding rotation of the staff; and a latch member G which cooperates with the dog to hold the same in inoperative position.

The housing A is of the usual type and has laterally outwardly extending sections of the end wall secured to the car wall 10 in any well known manner, preferably by rivets. The bottom wall of the housing is provided with a journal portion 11 for rotatably supporting the brake staff and ratchet mechanism. The brake staff B, the upper portion of which only is shown, is of the usual type and is provided with a portion at the bottom end thereof, not shown, on which the brake chain which leads to the brake shoes is wound. The upper portion of the staff B is preferably of square cross section, as indicated at 12, said square cross sectional portion being received within a similar opening 13 provided in the ratchet member C.

The ratchet member C is provided with the usual upper and lower sets of ratchet teeth 14 and 15 and has journal portions 16 and 17 at the top and bottom ends thereof, the journal portion 17 being mounted within the journal member 11. As shown in Figure 1, the top wall of the housing is provided with a recess 18 accommodating the journal portion 16 of the member C.

The carrier D is rotatably supported on the ratchet member C, having a journal section 19 in the top wall thereof, in which the journal portion 16 of the member C engages. The bottom wall of the carrier D is also provided with an opening through which the member C extends.

The operating handle E is pivotally mounted on the carrier D so as to swing in a vertical plane, the same being supported by a transverse pivot pin 20 extending through the inner end of the lever E and openings in the side walls of the carrier D. The outer end wall of the carrier D is provided with an opening 21 so as to permit vertical swinging movement of the lever E to bring the same from the full line position shown in Figure 1 to the position indicated in dotted lines.

The lever E is provided with the usual sliding pawl 22 which has a tooth section at the outer end thereof, adapted to cooperate with the teeth of the ratchet section 14. The pawl 22 is urged into engagement with the teeth by the usual coiled spring 23, also supported on the lever E. As will be evident, when the lever E is in horizontal position and is moved to and fro about the pivotal center of the carrier D, the tooth 22 will cooperate with the ratchet section 14 of the member C so as to impart intermittent rotation thereto and to the brake staff B, thereby effecting winding of the brake chain on the staff and tightening of the brakes.

The dog F is mounted on a vertically disposed pivot pin 24, suitably supported by the housing A. The dog is provided with a short, inwardly extending arm portion 25, provided with a tooth which cooperates with the ratchet section 15 of the ratchet member C. At the opposite side of the pivot 24, the dog is provided with an operating handle 26 of the usual form, for permitting the attendant to withdraw the tooth of the dog from engagement with the ratchet section 15, so as to render the dog inoperative and permit free rotation of the brake staff in an unwinding direction. The dog 25 is normally held in yielding engagement with the teeth of the ratchet member C by a coiled spring 27 interposed between the inner side of the arm 25 and the vertical end wall of the housing A, the housing wall and the arm 25 of the dog being provided with the usual bosses which engage within the coiled spring to hold the same assembled with the other parts.

Along the inner portion, section 25 of the dog is recessed, as most clearly shown in Figure 1, to provide an overhanging section 28 for a purpose hereinafter pointed out.

The latch member G comprises a relatively heavy upper main body portion and a laterally extending arm-like bottom portion 29, having a hooked end, as indicated at 30, which forms a locking tooth adapted to engage with the overhanging section 28 of the dog when the same is retracted to hold the dog in inoperative position. The latch member G is pivotally mounted by means of laterally extending lugs 31—31 on opposite sides of the main body portion thereof. The housing A is provided with supporting webs 32—32 for the latch member G, the supporting webs being formed integral with the vertical end wall of the housing and connected to the side wall of the housing by a horizontal supporting section 33. The web members 32 are provided with alined inclined slots 34 which terminate in circular openings 35 at their inner ends, which openings form the pivotal seats for the lugs 31 of the member G. As shown in Figure 4, the lugs 31 are elongated transversely and have rounded end sections 36—36 which form the bearing means proper thereof. The lugs 31 are of such a width that they will pass between the side walls of the slots 34 so that the latch member may be pivotally connected to the webs 32 by bringing the lugs 31 into the circular openings 35 and rotating the same to approximately the position shown in Figure 1, where the top and bottom bearing surfaces 36 are in engagement with the walls of the openings 35. As will be evident, when the lugs are turned to the position shown in Figure 1, the latch member G is locked to the housing for pivotal swinging movement about the axis of the lugs 31.

Upon reference to Figures 1 and 2, it will be seen that the lugs 31 are arranged to one side of the center of gravity of the relatively heavy main body portion of the member G, whereby the action of gravity will tend to rock the locking member so as to swing the tooth or hooked portion 30 thereof downwardly. In the normal position of the parts, that is, when the dog F is operative, the tooth or hook 30 of the latch G will rest on the upper face of the dog. When the dog is operated so as to retract the tooth portion thereof from engagement with the ratchet 15 of the member C and brought to the position shown in Figure 2, the latch G will be swung by gravity so as to engage with the undercut section 28 of the dog to lock the same in disengaged or inoperative position In order to render the dog F automatically operative upon the lever E of the brake mechanism being swung to and fro in a horizontal plane, the carrier D has the inner wall section thereof, which is of substantially cylindrical formation, provided with a pair of cam lugs 37 and 38. As shown in Figure 3, with the operating handle lever E disposed at right angles to the end wall 10 of the car, the lug 37 is disposed to one side of the axial center of the lever E while the lug 38 is disposed at the opposite side of said axial center. As shown, the lug 37 is more closely adjacent to the axial center of the lever E than the lug 38. The side walls of the housing are cut away to a sufficient extent to permit the passage of the lugs 37 and 38 without interference during to and fro swinging movement of the lever E and the oscillating movement of the carrier D.

The lugs 37 and 38 are arranged at such a height that they will engage with the latch member G immediately above the section 29 thereof. The latch member is provided with a rounded portion 39 at this point, which cooperates with the cam lugs 37 and 38. It will be evident that when the operating lever is swung in a horizontal plane to either side of the central position shown in Figure 3, one or the other of the lugs 37 or 38 will engage the rounded portion 39 of the latch member G, thereby rocking the same to raise the tooth 30 thereof out of engagement with the undercut portion of the dog, thus unlocking the parts and permitting the dog to be urged toward the ratchet member by the spring 27. As will be evident, the cam member 37 becomes operative to unlock the latch member G when the lever E is swung only a short distance from the central position shown in Figure 3, while the cam member 38 does not become operative to unlock the latch member until the lever E is swung to a point near the extreme limit of its movement during the time that the pawl 22 idles over the teeth of the ratchet member C. The lug 38 thus effects disengagement of the latch member from the dog a short time prior to the beginning of the swinging movement of the handle E in a chain-winding direction.

In the operation of my improved hand brake, assuming that the dog F is in its operative position and the operating lever E is raised so as to lie in a horizontal plane, the lever is moved to and fro about the pivotal center of the carrier C, thereby oscillating the carrier and bringing the cam lugs 37 and 38 alternately in operative position with respect to the latch member G.

Inasmuch as the tooth of the latch member G at this time is resting upon the top of the dog F, the main body portion of the latch member is so positioned that the cam lugs 37 and 38 do not engage and actuate the same. When the lever E is swung in a clockwise direction, as viewed in Figure 3, the pawl 22 effects rotation of the ratchet member C and the staff B, thus effecting winding of the brake chain and tightening of the brakes. During this rotation of the ratchet member, the tooth section 25 of the dog F will idle over the teeth of the ratchet section 15. As soon as the lever E is swung in the reverse direction, the staff B will be held against retrograde movement or movement in an unwinding direction by the tooth portion 25 of the dog engaging one of the teeth of the ratchet section 15. During this swinging movement of the lever E, the pawl 22 will idle over the teeth of the ratchet section 14. The operation just described will be repeated during each to-and-fro movement of the operating lever E until the brakes have been sufficiently tightened. When it is desired to release the brakes, the operator pulls the handle end 26 of the locking dog F outwardly, thereby disengaging the tooth portion 25 of the dog from the ratchet section 15 of the member C, thus permitting free rotation of the member C and the brake staff B in an unwinding direction. When the handle portion 26 of the dog is pulled outwardly, the section 25 is moved a sufficient distance away from the ratchet member C to permit the latch G to swing on its pivot, due to the action of gravity, and cause the tooth 30 to engage with the overhanging section 28 of the dog, thus locking the latter in inoperative position.

This latching means is of great importance in connection with hand brakes, because it prevents the dog from re-engaging the ratchet teeth of the staff, thereby preventing incomplete unwinding of the chain and dragging of the brake shoes on the wheels of the car. The lever E may be dropped when in the position shown in Figure 3, wherein the axis of the same is at right angles to the end wall of the car, or the same may be dropped when the carrier has been turned to such a position as to dispose the lever parallel to the end wall of the car at the same side of the housing on which the operating lever 26 of the dog F is located. It will be evident that in either of the two positions last referred to, the lugs 37 and 38 will be so disposed that they will not engage the latch member G so as to unlock the same. When it is desired to again operate the brakes to tighten the chain, the lever E is merely oscillated in the usual manner to effect the proper rotation of the brake staff. As will be evident, as soon as the lever is swung from either a position parallel to or at right angles to the wall 10, the lug 37 or the lug 38 is brought into engagement with the rounded portion 39 of the latch member G, thereby swinging the latch member toward the end wall of the housing and raising the tooth 30 thereof out of engagement with the undercut portion of the dog and unlocking the dog so that the same will again be free to cooperate with the ratchet section 15 of the member C to prevent retrograde movement thereof. Inasmuch as the lugs 37 and 38 pass the latch member G during each oscillation of the carrier, it is clear that there is no danger of the latch accidentally engaging the dog so as to lock the same in inoperative position.

From the preceding description, taken in connection with the drawings, it will be evident that I have provided an exceedingly simple and efficient means for assuring proper operation of hand brakes, wherein a locking dog is employed to prevent retrograde movement of the brake-winding means and the locking dog is adapted to be locked in inoperative position. By the arrangement provided, it is not necessary for the brakeman to manually release the locking means for holding the dog in inoperative position each time the brake mechanism is operated.

While I have herein shown and described what I consider the preferred manner of carrying out my invention, the same is merely illustrative and I contemplate all changes and modifications that come within the scope of the claims appended hereto.

I claim:

1. In a hand brake, the combination with a rotatable chain-winding member; of means for intermittently rotating said member, including a lever-operated carrier rotatably mounted to turn about said member in reverse directions; means for preventing unwinding movement of said member, including a dog and cooperating ratchet means the ratchet means being fixed to the chain winding member; spring means for holding said dog in engagement with the ratchet means, said dog being movable to inoperative position to permit free rotation of said member; a latch element for locking the dog in inoperative position; and means on the carrier for unlocking said latch element from the dog upon movement of the carrier in either of said reverse directions.

2. In a hand brake, the combination with a vertical brake staff adapted to have a brake chain wound thereon; of a carrier mounted for rotation about said staff; a lever pivoted to the carrier, cooperating ratchet means on said lever and staff for intermittently rotating the staff to wind the brake chain; a second ratchet on the staff; a pivoted dog; means for forcing said dog into engagement with said last named ratchet to prevent rotation thereof in an unwinding direction, said dog being manually movable to inoperative position; a latch for locking the dog in inoperative position; and spaced cam means on the carrier, engaging said latch in two different positions of the carrier for unlocking the latch from the dog.

3. In a hand brake, the combination with a housing adapted to be secured to the end wall of a car; of a vertically disposed chain-winding staff rotatably supported in the housing; a carrier rotatable about said staff; an operating lever connected to the carrier for oscillating the latter, said lever having means thereon for intermittently engaging with the staff to rotate the same in a direction to tighten the brakes; a ratchet fixed to the staff; a dog pivoted to the housing; spring means for forcing the dog into engagement with the ratchet to hold the staff against retrograde rotation, said dog having an operating handle by which the same may be manually disengaged from the ratchet and thrown to an inoperative position; a gravity-actuated latch engageable with the dog for locking the latter in inoperative position; and a pair of spaced cam members on the carrier engageable with the latch when the operating lever is thrown to either side of a position at right angles to the car wall, to unlock said latch from the dog and permit return of the latter to operative position.

In witness that I claim the foregoing I have hereunto subscribed my name this 16th day of November, 1928.

CHARLES A. ZWEIBEL.